March 19, 1963    N. A. BOWERS    3,081,635
BORING TOOL
Filed April 21, 1961
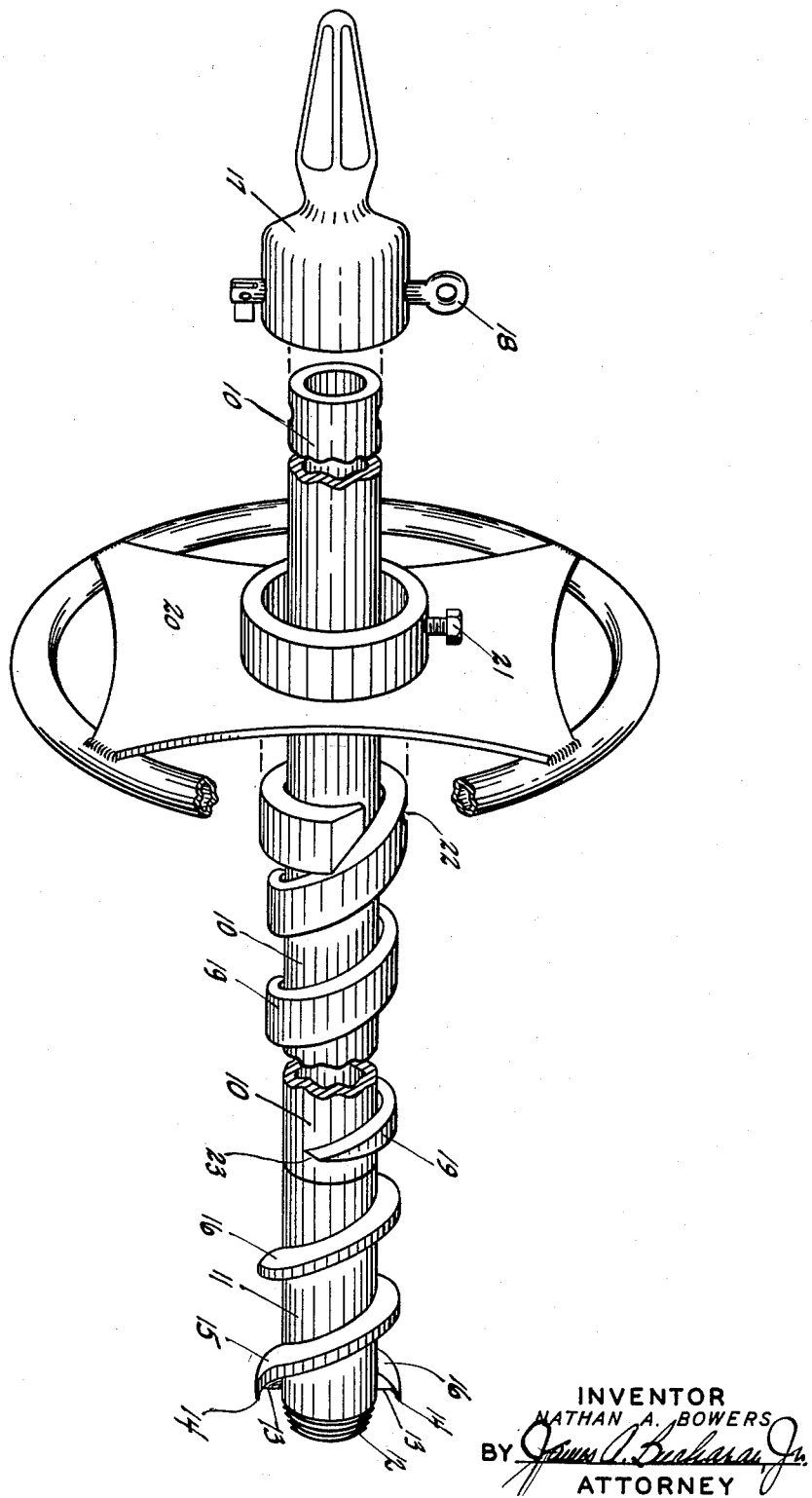
INVENTOR
NATHAN A. BOWERS
BY
ATTORNEY

3,081,635
BORING TOOL
Nathan A. Bowers, Atherton, Calif.
(501 Portola Road, Portola Valley, Calif.)
Filed Apr. 21, 1961, Ser. No. 104,563
4 Claims. (Cl. 73—425)

This invention relates to boring tools.

In conventional boring tools, such as ordinary augers, bits and wood-coring tools, the material generated by the boring action of the cutting head is removed from the drilled bore by the action of screw-type conveyor means formed around the shank of the tool as an integral part thereof. In such tools the material removal is performed as the boring action proceeds and, of course, the rate at which such material is removed is a function of the rotational speed at which the shank drives the cutting head.

Conventional tools wherein material removal is effected as above have many disadvantages. For example, in boring holes of any great depth, skillful handling by an experienced operator is required to prevent the tool from being driven into a chip-wedged position. Should the tool be driven into such a position, it is often impossible to extract it and it is common practice in such situations to burn the tool off with a torch at the surface.

To prevent chip-wedging, the experienced operator will frequently withdraw the tool at necessary intervals by jerking the tool backwards to remove the chips from the bore. This maneuver is, however, time consuming, and the greater the depth of the bore, the more frequently it must be performed.

Moreover, in certain boring operations the jerk-out method of chip removal is impractical. In core-taking tools for the taking of tree samples for laboratory analysis—that is, for studying rates of growth, age, etc.—it is desirable that the core be taken in one continuous operation if possible. However, in the use of conventional tools for taking cores from large diameter trees, the tool must be withdrawn to supplement the ineffectiveness of the ordinary screw-conveyor means of chip removal, with the result that the core sample is usually taken in several sections. This necessitates special provisions being taken to preserve the relationship of the core pieces and there is danger that core sections may be damaged or lost and that continuity cannot be reconstructed.

It is the object of my invention to provide an improved means for removing material from a bore which will overcome the disadvantages of the screw-type conveyor means conventionally employed.

Another object of my invention is to provide an improved material removing means for boring tools which will permit the removal of such material independently of the boring action of the tool's cutting head.

A further object of my invention is to provide an improved rotatable screw-conveyor, material-removing means for boring tools wherein the cutting head and material-removing means may be separately rotated at speeds best suited to their respective functions.

A still further object of my invention is to provide an improved core-taking tool which will permit the taking of single-piece cores of great length.

The above as well as other objects, advantages and features of the invention will be readily apparent from the accompanying drawing illustrating the invention in accordance with one of its preferred embodiments, the subjoined detailed description, and the appended claims.

Referring now to the drawing in detail, wherein a core-taking tool is shown in perspective and partly in section:

The core-taking tool is comprised of a tubular member 10 which drives a cutting head 11. The cutting head 11 may be formed as an integral part of the tubular member 10 or, as shown, may be removably fixed to the end of the member by conventional means (not shown). Where the tubular member and cutting head are not formed integrally, the cutting head 11 is, of course, provided with a bore of the same internal diameter as that of the tubular member 10 and which, when the cutting head is secured to the tubular member, is contiguous therewith.

The cutting head 11 is provided with a conventional threaded element 12 which tapers forwardly so that the end of the foremost thread terminates at the circular cutting edge of the head, and with conventional cutting elements 13 and 14 formed at the ends of each of the two spiral elements 15 and 16.

The other end of the tubular member 10 is adapted to fit in the bore of member 17 by means of which the tubular member 10 and cutting head 11 may be rotated by conventional power driving means (not shown). The two members 10 and 17 are locked together by the locking pin 18.

A spiral member 19 is mounted on the member 10 behind the cutting head 11. It is desirable that the internal diameter of the spiral member 19 be slightly greater than the external diameter of the tubular member 10 to permit the spiral member to be easily rotated about and/or slid along the member 10, without allowing material removed by the cutting head 11 to become wedged between the two such members. The outer diameter of the spiral member 19 is equal to, or to facilitate rotation, may be slightly less than the dameter of the bore formed by the cutting head 11.

The spiral member 19 is driven by a hand wheel 20 which is secured to the end of the spiral member by means of the bolt 21 which when turned in is engaged in the hole 22 and, when desired, when turned in further engages the tubular member 10 to lock the hand wheel 20 and spiral member 19 to the tubular member 10. If desired, means could be substituted for the hand wheel 20 which would permit the spiral member 19 to be driven by power means.

In operation, fragments or chips, removed by the cutter-head elements 13 and 14, are passed back by the elements 15, 16 where they may be picked up by the forward blade end 23 of the spiral member 19. Since the spiral member 19 is separate from the tubular member 10, its rotation may be selected for whatever operation is best suited to removal of the chips.

Actual operating procedure will vary according to that best suited to continuous operation of the cutting head. For example, one operating procedure would be to operate the spiral member 19 continuously at such rotational speeds—usually greater than that at which the cutting head is operated—that the fragments or chips are removed from the bore continuously as they are generated. Another operating procedure which may be used would be to operate the spiral member 19 at intervals as the fragments or chips build up in the bore behind the cutting head. In either material removing operation, should the chips or fragments jam or wedge in the bore behind the cutting head, rotation of the cutting head can be stopped and its exact position retained while the obstruction is cleared by rotation of the spiral member 19. By this procedure, the core remains unbroken and undisturbed within the tubular member 10 and the cutting head 11 remains in exactly the same position, ready to resume its operation when the obstruction is cleared.

While the invention has been illustrated and described according to one of the preferred embodiments thereof, obviously many modifications and variations of the invention may be made without departing from the spirit

I claim:

1. A core taking tool comprising a rotatable tubular shaft member, a cutting head driven by said shaft member, said cutting head having a central bore in axial alignment with the longitudinal axis of the tubular shaft member and approximately the same internal diameter as that of the said tubular shaft member, a screw conveyor element supported by said tubular shaft member and adapted upon rotation to remove material generated by the cutting head in cutting of the core, said screw conveyor element being rotatable about the tubular shaft member independently of rotation of said member.

2. In a core taking tool, the means for removing material from the bore generated by the boring action of a cutter head driven by a supporting tubular shaft member, comprising a rotatable screw conveyor element having an internal diameter slightly larger than the external diameter of said tubular shaft member, said screw conveyor element being slidable about said shaft member, and adapted upon rotation to engage the said material and convey the same out of the bore, said screw conveyor element being rotatable independently of any rotation of the shaft member.

3. A core taking tool comprising in combination: a rotatable tubular shaft member having a cutting head at one end, and screw conveyor means carried about said shaft member for removing from the bore material generated by the boring action of the cutting head, said screw conveyor means being slidable along the outer circumference of said shaft member to engage the material generated by the boring action of the cutting head and rotatable independently of any rotation imparted to said shaft member and cutting head to convey said material from the bore.

4. A core taking tool comprising in combination: a cutting head driven by a rotatable tubular shaft member, and screw conveyor means supported about said shaft member about its outer circumference behind the cutting head and adapted upon rotation to remove from the bore material generated by the cutting head, the said cutting head and screw convenyor means each being separately rotatable independent of rotation of the other according the best advantage of their respective functions.

References Cited in the file of this patent
UNITED STATES PATENTS

| | | |
|---|---|---|
| 408,223 | Draper | Aug. 6, 1889 |
| 598,146 | Glover | Feb. 1, 1898 |
| 715,631 | Ayres | Dec. 9, 1902 |
| 1,456,983 | Hansen | May 29, 1923 |
| 2,946,567 | Pepper | July 26, 1960 |